(12) United States Patent
Howell et al.

(10) Patent No.: US 6,266,961 B1
(45) Date of Patent: Jul. 31, 2001

(54) FILM COOLED COMBUSTOR LINER AND METHOD OF MAKING THE SAME

(75) Inventors: Stephen J. Howell, Georgetown; Jennifer Waslo, Marblehead, both of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/418,073

(22) Filed: Oct. 14, 1999

(51) Int. Cl.⁷ ........................................................ F02C 1/00
(52) U.S. Cl. ..................................................... 60/752
(58) Field of Search ................................. 60/39.821, 752, 60/754, 39.02, 756, 757

(56) References Cited

U.S. PATENT DOCUMENTS

| | | | |
|---|---|---|---|
| 2,979,898 | * 4/1961 | Ward | 60/39.66 |
| 3,978,662 | * 9/1976 | Dubell et al. | 60/39.65 |
| 4,622,821 | * 11/1986 | Madden | 60/757 |
| 4,700,544 | * 10/1987 | Fucci | 60/757 |
| 5,123,248 | * 6/1992 | Monty et al. | 60/740 |
| 5,181,379 | 1/1993 | Wakeman et al. | 60/261 |
| 5,233,828 | 8/1993 | Napoli | 60/261 |
| 5,279,127 | 1/1994 | Napoli | 60/754 |
| 5,924,288 | * 7/1999 | Fortuna et al. | 60/752 |

* cited by examiner

*Primary Examiner*—Timothy S. Thorpe
*Assistant Examiner*—W. Rodriguez
(74) *Attorney, Agent, or Firm*—Andrew C. Hess; Rodney M. Young

(57) ABSTRACT

A combustor liner for use in a gas turbine engine includes a first annular panel section having a first cooling nugget formed at one end thereof and a second annular panel section having a second cooling nugget formed at one end thereof. A first row of cooling holes is formed in the first cooling nugget, and a second row of cooling holes is formed in the second cooling nugget. The second row of cooling holes is arranged in a preferential cooling pattern including a plurality of arrays, each array has a first set of cooling holes having a first diameter and a second set of cooling holes having a second diameter that is smaller than the first diameter. The cooling hole arrays are preferably arranged to minimize tooling set-ups and thereby reduce cost. At least one igniter tower is formed in the first annular panel section and is circumferentially aligned with one of the second sets of cooling holes.

38 Claims, 3 Drawing Sheets

FILM COOLED COMBUSTOR LINER AND METHOD OF MAKING THE SAME

BACKGROUND OF THE INVENTION

This invention relates generally to gas turbine engines and more particularly to film cooled combustor liners used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Combustors used in aircraft engines typically include inner and outer combustor liners to protect the combustor and surrounding engine components from the intense heat generated by the combustion process. The combustor liners are cooled to meet life expectancy requirements.

Liner cooling is commonly provided by diverting a portion of the compressed air (which is relatively cool) and causing it to flow over the outer surfaces of the liners. In addition, a thin layer of cooling air is provided along the combustion side of the liners by directing cooling air flow through circumferentially disposed rows of cooling holes formed in the liners. This technique, referred to as film cooling, reduces the overall thermal load on the liners because the mass flow through the cooling holes dilutes the hot combustion gas next to the liner surfaces, and the flow through the holes provides convective cooling of the liner walls. In one known configuration, film cooling is accomplished by forming the liner with a plurality of integrally formed panel sections with a bump or nugget formed on the forward end of each panel section. A circumferentially disposed row of axially oriented cooling holes is formed in the nugget so that the thin film of cooling air is produced along the inner surface of the panel section.

While film cooling of combustor liners is generally quite effective, various conditions in gas turbine combustors can reduce the cooling film effectiveness in specific regions of the liners. For instance, due to various phenomena that commonly occur inside combustors, the heating load is not uniformly distributed about the liners. This leads to specific regions in the combustor that require additional cooling. Increasing the film cooling flow will solve this problem but results in excess cooling air for the regions that do not require additional cooling, thereby reducing engine performance. Accordingly, preferential cooling hole patterns have been developed wherein different hole diameters are used over the combustor so that additional cooling is provided only where needed.

One specific condition that can reduce cooling film effectiveness is the presence in the combustor liners of igniter towers that hold the igniters for initiating combustion in the combustor. The igniter towers disrupt the flow of cooling air over the combustor liners, thereby reducing the cooling film effectiveness behind them. Thus, regions of the liners immediately downstream of the igniter towers will be prone to a loss of cooling film effectiveness. This condition has been addressed by adding a set of radially oriented cooling holes to the nugget immediately downstream of the igniter towers as well as increasing the diameter of some of the axially oriented cooling holes in that nugget. However, because many different cooling hole sizes and patterns are employed, several tooling set-ups are required. This adds to the time and cost of manufacturing the liners.

Accordingly, there is a need for a combustor liner having a cooling scheme that optimizes cooling film effectiveness while minimizing tooling set-up requirements.

SUMMARY OF THE INVENTION

The above-mentioned need is met by the present invention which provides a gas turbine combustor liner that includes a first annular panel section having a first cooling nugget formed at one end thereof and a second annular panel section having a second cooling nugget formed at one end thereof. A first row of cooling holes is formed in the first cooling nugget, and a second row of cooling holes is formed in the second cooling nugget. The second row of cooling holes is arranged in a preferential cooling pattern including a plurality of arrays, each array has a first set of cooling holes having a first diameter and a second set of cooling holes having a second diameter that is smaller than the first diameter. At least one igniter tower is formed in the first annular panel section and is circumferentially aligned with one of the second sets of cooling holes.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
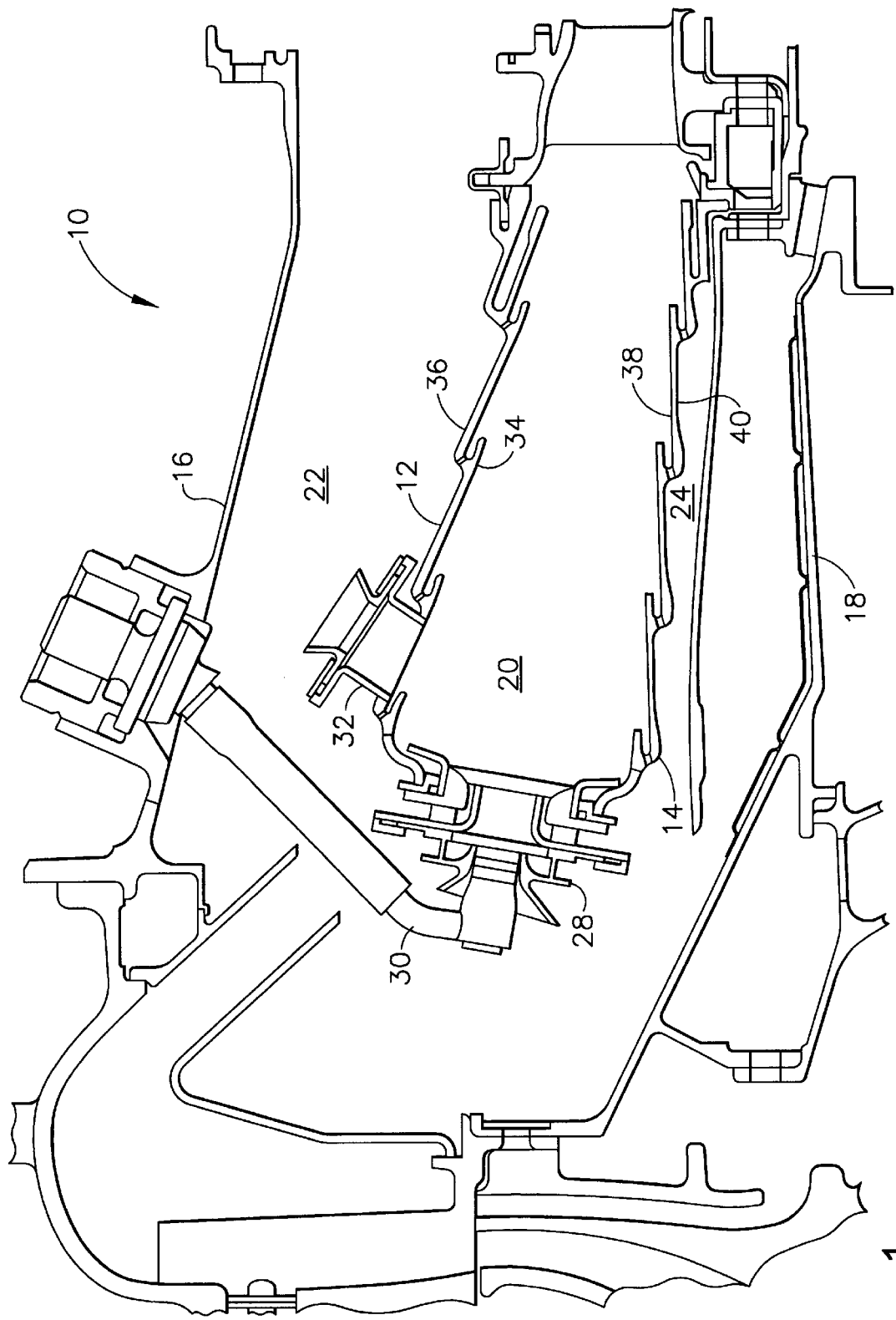
FIG. 1 is a longitudinal sectional view of a gas turbine combustor having the combustor liners of the present invention.

Referring to the drawings wherein identical reference numerals denote the same elements throughout the various views, FIG. 1 shows a combustor 10 of the type suitable for use in a gas turbine engine. The combustor 10 includes an outer liner 12 and an inner liner 14 disposed between an outer combustor casing 16 and an inner combustor casing 18. The outer and inner liners 12 and 14 are radially spaced from each other to define a combustion chamber 20. The outer liner 12 and the outer casing 16 form an outer passage 22 therebetween, and the inner liner 14 and the inner casing 18 form an inner passage 24 therebetween. As is known in the art, compressed air is supplied from a compressor (not shown) located upstream of the combustor 10. The compressed air passes principally into the combustor 10 to support combustion and partially into the outer and inner passages 22 and 24 where it is used to cool the liners 12 and 14 and turbo machinery further downstream.

A plurality of circumferentially spaced swirler assemblies 28 (only one shown in FIG. 1) is mounted at the upstream ends of the outer and inner liners 12 and 14. Each swirler assembly 28 receives compressed air from the compressor and fuel from a corresponding fuel tube 30. The fuel and air are swirled and mixed by swirler assemblies 28, and the resulting fuel/air mixture is discharged into combustion chamber 20. The fuel/air mixture is ignited by one or more igniters (not shown) mounted in igniter towers 32 (only one shown in FIG. 1) which are disposed around the circumference of the outer liner 12. It is noted that although FIG. 1 illustrates one preferred embodiment of a single annular combustor, the present invention is equally applicable to any type of combustor, including double annular combustors, which uses film cooling.

The outer and inner liners 12 and 14 each comprise a single wall, metal shell having a generally annular and axially extending configuration. Each shell includes a plurality of integrally formed panel sections having cooling nuggets formed on the forward end thereof. The outer liner 12 has a hot side 34 facing the hot combustion gases in the combustion chamber 20 and a cold side 36 in contact with the relatively cool air in the outer passage 22. Similarly, the inner liner 14 has a hot side 38 facing the hot combustion gases in the combustion chamber 20 and a cold side 40 in contact with the relatively cool air in the inner passage 24.

Figure 2:
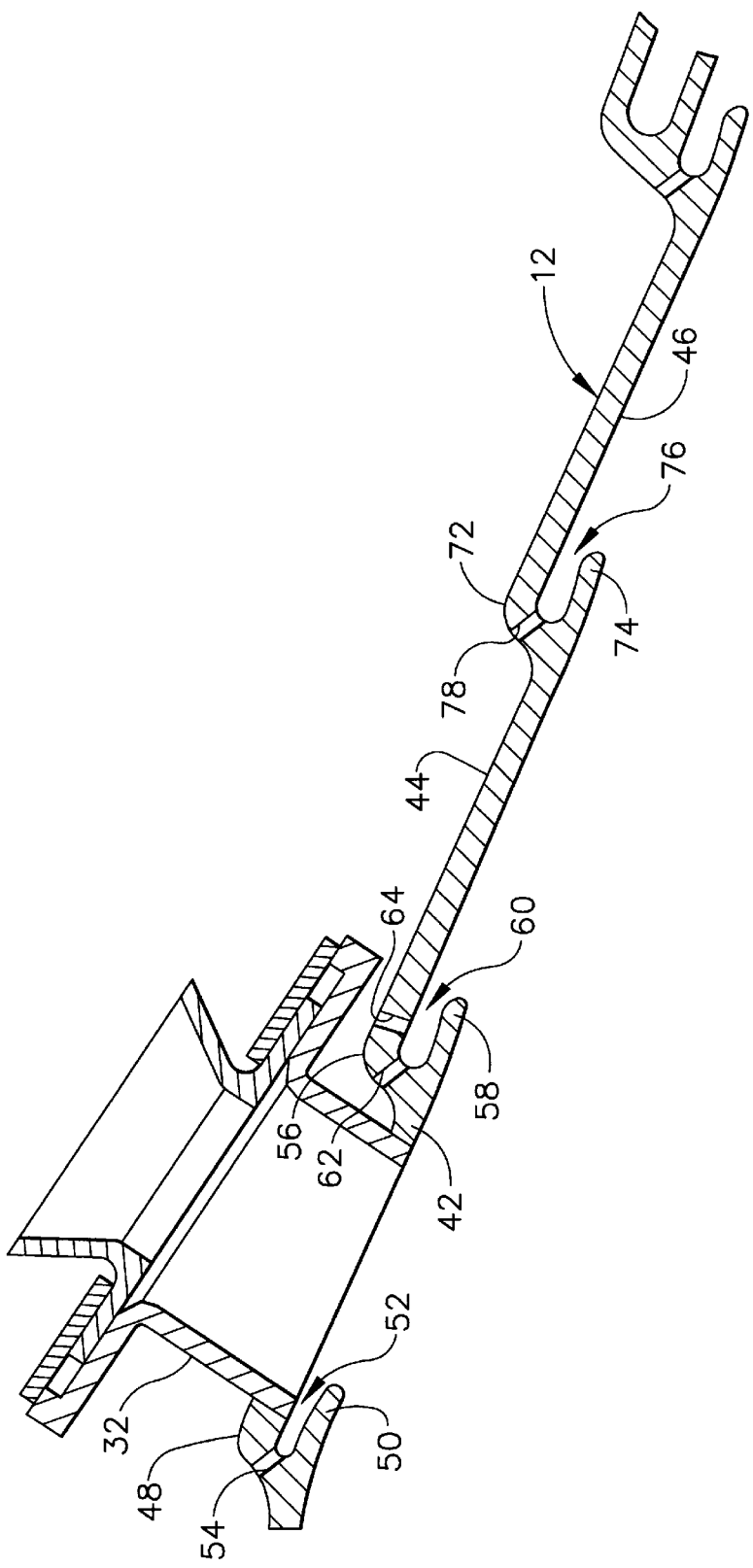
FIG. 2 is a sectional view of a portion of a combustor liner from FIG. 1.

Turning now to FIG. 2, the cooling scheme of the outer liner 12 is shown in more detail. The outer liner 12 includes a first panel section 42, a second panel section 44, and a third panel section 46. The panel sections 42,44,46 are preferably integrally formed, and each section has a substantially annular configuration. The first panel section 42 has a first cooling nugget 48 formed at the forward end thereof. The first cooling nugget 48 includes an annular lip 50 formed thereon and spaced radially inward so as to define a cooling slot 52. A row of substantially axially oriented cooling holes 54 is formed in the first cooling nugget 48 to feed cooling air to the first cooling slot 52. The first cooling slot 52 is oriented in a substantially axial direction so that cooling air is directed downstream and forms a thin cooling film on the combustion side of the first panel section 42. The first cooling holes 54 are distributed about the entire circumference of the cooling nugget 48 and are preferably equally spaced. In one preferred embodiment, the first cooling nugget 48 has 324 cooling holes 54, all having the same diameter of about 0.035 inches (0.89 mm) with a tolerance of about ±0.002 inches (0.05 mm). By using the same hole diameter for all of the first cooling holes 54, machining operations (which are typically electrical discharge machining operations) can be performed continually without requiring an additional setup operation.

The igniter tower 32 is located in the first panel section 42. Although only one such igniter tower is shown in FIG. 2, it should be noted that other igniter towers could be located at other circumferential locations on the outer liner 12. The second panel section 44 is joined at its forward end to the aft end of the first panel section 42. A second cooling nugget 56 is formed at the forward end of the second panel section 44, downstream of the igniter tower 32. The second cooling nugget 56 includes an annular lip 58 formed thereon and spaced radially inward so as to define a cooling slot 60. A row of substantially axially oriented cooling holes 62 is formed in the second cooling nugget 56 to feed cooling air to the second cooling slot 60. In addition, a row of radially oriented cooling holes 64 is formed in the second cooling nugget 56, slightly downstream from the axial cooling holes 62, for supplying additional cooling air to the second cooling slot 60. In addition, the radial cooling holes 64 provide impingement cooling to further reduce the temperature of the lip 58. The second cooling slot 60 is oriented in a substantially axial direction so that cooling air is directed downstream and forms a thin cooling film on the combustion side of the second panel section 44.

The axial cooling holes 62 are distributed about the entire circumference of the second cooling nugget 56 and are preferably equally spaced. The radial cooling holes 64 are also disposed circumferentially, but are only located in the portions of the second cooling nugget 56 that are circumferentially aligned with an igniter tower 32. Additional air is thus supplied to these regions to counteract the disruptive effect of the igniter tower 32 on the cooling air flow. In addition, the axial cooling holes 62 are arranged in a preferential cooling hole pattern wherein different hole diameters are used in different areas on the second cooling nugget 56.

Figure 3:
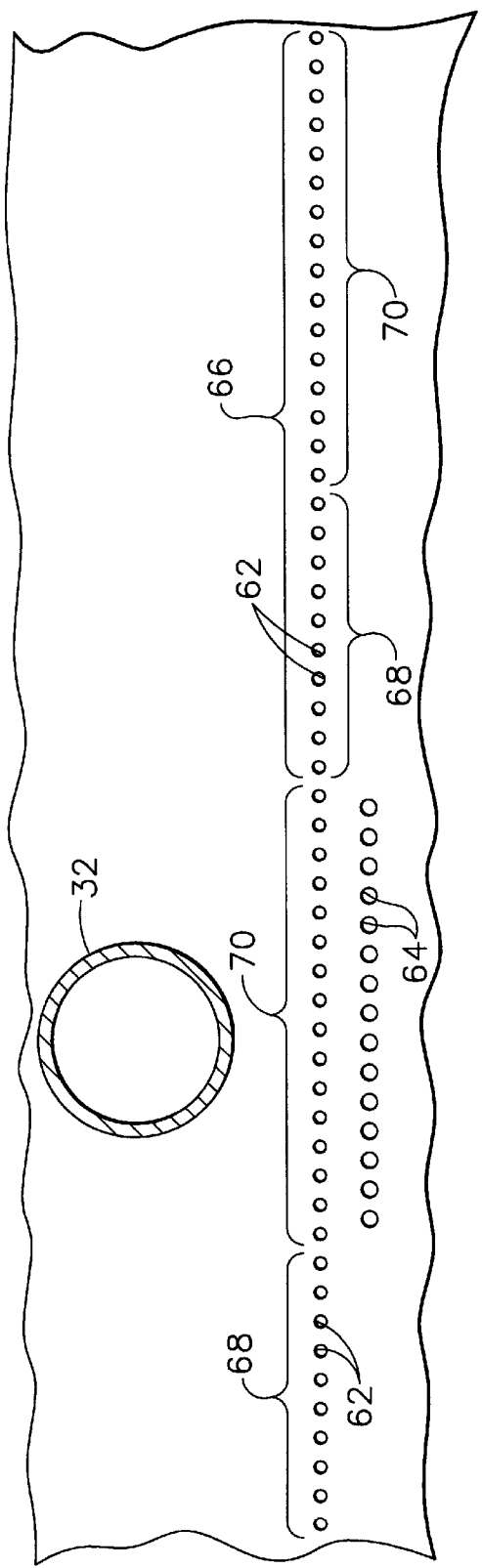
FIG. 3 is a radial view of a portion of the combustor liner of FIG. 2.

FIG. 3 shows one preferred embodiment in which the axial cooling holes 62 are arranged in a preferential cooling pattern made up of 12 arrays 66 of 26 axial cooling holes 62. Preferably, each array 66 is aligned with one of the fuel tubes 30 and a corresponding one of the swirler assemblies 28, of which there are 12. Each array 66 comprises a first set 68 of 10 axial cooling holes 62 having a diameter of about 0.029 inches (0.74 mm) with a tolerance of about ±0.002 inches (0.05 mm) and a second set 70 of 16 axial cooling holes 62 having a diameter of about 0.025 inches (0.63 mm) with a tolerance of about ±0.002 inches (0.05 mm). The axial cooling hole array 66 is repeated 12 times around the circumference of the second cooling nugget 56 to provide a total of 312 axial cooling holes 62. The axial cooling hole array 66 is arranged so that the igniter tower 32 is circumferentially aligned with one of the second sets 70. Any additional igniter towers are also circumferentially aligned with one of the second sets 70. The radial cooling holes 64 are arranged in a pattern wherein a set of 15 radial cooling holes 64 is circumferentially aligned with each igniter tower 32. Each radial cooling hole 64 has a diameter of about 0.032 inches (0.81 mm) with a tolerance of about ±0.002 inches (0.05 mm).

The axial cooling holes 62 can be formed by an electrical discharge machining (EDM) process using an EDM tool having a plurality of electrodes matching the 26 axial cooling holes 62 of each axial cooling hole array 66. That is, the EDM tool would have 10 electrodes sized to machine the 10 holes of the first set 68 and 16 electrodes sized to machine the 16 holes of the second set 70. Thus, axial hole machining operations can be performed continually without requiring an additional setup operation. The radial cooling holes 4 require one further setup operation.

Referring again to FIG. 2, the third panel section 46 is joined at its forward end to the aft end of the second panel section 44. A third cooling nugget 72 is formed at the forward end of the third panel section 46. The third cooling nugget 72 includes an annular lip 74 formed thereon and spaced radially inward so as to define a cooling slot 76. A row of substantially axially oriented cooling holes 78 is formed in the third cooling nugget 72 to feed cooling air to the third cooling slot 76. The third cooling slot 76 is oriented in a substantially axial direction so that cooling air is directed downstream and forms a thin cooling film on the combustion side of the third panel section 46. The third cooling holes 78 are distributed about the entire circumference of the third cooling nugget 72 and are preferably equally spaced. Moreover, the third cooling holes 78 are arranged in a preferential cooling hole pattern wherein different hole diameters are used in different areas on the third cooling nugget 72.

Figure 4:
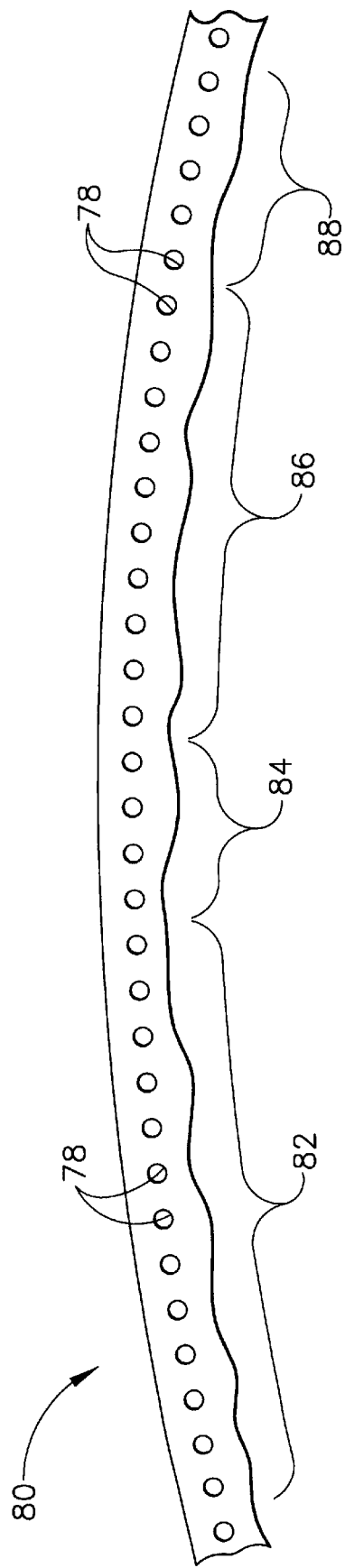
FIG. 4 is a fragmentary axial sectional view of a portion of the combustor liner of FIG. 2.

FIG. 4 shows one preferred embodiment in which the third cooling holes 78 are arranged in a preferential cooling pattern made up of 12 arrays 80 of 32 cooling holes 78. Each array 80 comprises a first set 82 of 13 cooling holes 78, a second set 84 of 4 cooling holes 78, a third set 86 of 10 cooling holes 78, and a fourth set 88 of 5 cooling holes 78.

The cooling holes 78 of the first set 82 each have a diameter of about 0.032 inches (0.81 mm) with a tolerance of about ±0.002 inches (0.05 mm). The cooling holes 78 of the second set 84 each have a diameter of about 0.037 inches (0.94 mm) with a tolerance of about ±0.002 inches (0.05 mm). The cooling holes 78 of the third set 86 each have a diameter of about 0.032 inches (0.81 mm) with a tolerance of about ±0.002 inches (0.05 mm). Lastly, the cooling holes 78 of the fourth set 88 each have a diameter of about 0.037 inches (0.94 mm) with a tolerance of about ±0.002 inches (0.05 mm). The third cooling hole array 80 is repeated 12 times around the circumference of the third cooling nugget 72 to provide a total of 384 axial cooling holes 78.

As before, the axial cooling holes 78 can be formed using an EDM tool having a plurality of electrodes matching the 32 axial cooling holes 78 of each third cooling hole array 80. Thus, the EDM tool would have 13 electrodes sized to machine the 13 holes of the first set 82, 4 electrodes sized to machine the 4 holes of the second set 84, 10 electrodes sized to machine the 10 holes of the third set 86, and 5 electrodes sized to machine the 5 holes of the fourth set 88. Thus, machining operations can be performed continually without requiring an additional setup operation.

The foregoing has described combustor liner having a cooling scheme that optimizes cooling film effectiveness without requiring excessive tooling set-up requirements. While specific embodiments of the present invention have been described, it will be apparent to those skilled in the art that various modifications thereto can be made without departing from the spirit and scope of the invention as defined in the appended claims.

What is claimed is:

1. A gas turbine combustor liner comprising:
   a first annular panel section having a first cooling nugget formed at one end thereof;
   a first row of cooling holes formed in said first cooling nugget;
   a second annular panel section having a second cooling nugget formed at one end thereof;
   a second row of cooling holes formed in said second cooling nugget, said second row of cooling holes being arranged in a preferential cooling pattern comprising a plurality of arrays, wherein each said array comprises a first set of cooling holes having a first diameter and a second set of cooling holes having a second diameter that is smaller than said first diameter; and
   at least one igniter tower formed in said first annular panel section, said at least one igniter tower being circumferentially aligned with one of said second sets of cooling holes.

2. The combustor liner of claim 1 wherein all of said cooling holes in said first row of cooling holes have the same diameter.

3. The combustor liner of claim 2 wherein all of said cooling holes in said first row of cooling holes have a diameter of about 0.89 millimeters.

4. The combustor liner of claim 1 wherein said first diameter is about 0.74 millimeters and said second diameter is about 0.63 millimeters.

5. The combustor liner of claim 4 wherein each one of said first sets of cooling holes comprises 10 cooling holes, and each one of said second sets of cooling holes comprises 16 cooling holes.

6. The combustor liner of claim 5 wherein there are 12 of said arrays.

7. The combustor liner of claim 1 further comprising an additional row of cooling holes formed in said second panel section circumferentially aligned with said at least one igniter tower.

8. The combustor liner of claim 7 wherein said additional cooling holes have a diameter of about 0.81 millimeters.

9. The combustor liner of claim 7 wherein there are 15 of said additional cooling holes.

10. The combustor liner of claim 1 further comprising:
    a third annular panel section having a third cooling nugget formed at one end thereof; and
    a third row of cooling holes formed in said third cooling nugget, said third row of cooling holes being arranged in a preferential cooling pattern comprising a plurality of arrays, wherein each one of said third row arrays comprises a first set of cooling holes having a first diameter, a second set of cooling holes having a second diameter, a third set of cooling holes having a third diameter, and a fourth set of cooling holes having a fourth diameter.

11. The combustor liner of claim 10 wherein said first diameter of said third row is about 0.81 millimeters, said second diameter of said third row is about 0.94 millimeters, said third diameter of said third row is about 0.81 millimeters, and said fourth diameter of said third row is about 0.94 millimeters.

12. The combustor liner of claim 11 wherein each one of said first sets of third row cooling holes comprises 13 cooling holes, each one of said second sets of third row cooling holes comprises 4 cooling holes, each one of said third sets of third row cooling holes comprises 10 cooling holes, and each one of said fourth sets of third row cooling holes comprises 5 cooling holes.

13. The combustor liner of claim 12 wherein there are 12 of said third row arrays.

14. A gas turbine combustor liner comprising:
    a first annular panel section having a forward end and an aft end and a first cooling nugget formed at said forward end thereof;
    a first row of axially oriented cooling holes formed in said first cooling nugget;
    a second annular panel section having a forward end and an aft end and a second cooling nugget formed at said forward end thereof, said second annular panel section being joined at its forward end to said aft end of said first annular panel section;
    a second row of axially oriented cooling holes formed in said second cooling nugget, said second row of axially oriented cooling holes being arranged in a preferential cooling pattern comprising a plurality of arrays, wherein each said array comprises a first set of cooling holes having a first diameter and a second set of cooling holes having a second diameter that is smaller than said first diameter;
    a row of radially oriented cooling holes formed in said second cooling nugget; and
    at least one igniter tower formed in said first annular panel section, said at least one igniter tower being circumferentially aligned with one of said second sets of cooling holes and said row of radially oriented cooling holes.

15. The combustor liner of claim 14 wherein all of said cooling holes in said first row of axially oriented cooling holes have the same diameter.

16. The combustor liner of claim 15 wherein all of said cooling holes in said first row of axially oriented cooling holes have a diameter of about 0.89 millimeters.

17. The combustor liner of claim 14 wherein said first diameter is about 0.74 millimeters and said second diameter is about 0.63 millimeters.

18. The combustor liner of claim 17 wherein each one of said first sets of cooling holes comprises 10 cooling holes, and each one of said second sets of cooling holes comprises 16 cooling holes.

19. The combustor liner of claim 18 wherein there are 12 of said arrays.

20. The combustor liner of claim 14 wherein all of said cooling holes in said row of radially oriented cooling holes have a diameter of about 0.81 millimeters.

21. The combustor liner of claim 20 wherein there are 15 of said radially oriented cooling holes.

22. The combustor liner of claim 14 further comprising:
a third annular panel section having a forward end and an aft end and a third cooling nugget formed at said forward end thereof, said third annular panel section being joined at its forward end to said aft end of said second annular panel section; and
a third row of axially oriented cooling holes formed in said third cooling nugget, said third row of axially oriented cooling holes being arranged in a preferential cooling pattern comprising a plurality of arrays, wherein each one of said third row arrays comprises a first set of cooling holes having a first diameter, a second set of cooling holes having a second diameter, a third set of cooling holes having a third diameter, and a fourth set of cooling holes having a fourth diameter.

23. The combustor liner of claim 22 wherein said first diameter of said third row is about 0.81 millimeters, said second diameter of said third row is about 0.94 millimeters, said third diameter of said third row is about 0.81 millimeters, and said fourth diameter of said third row is about 0.94 millimeters.

24. The combustor liner of claim 23 wherein each one of said first sets of third row cooling holes comprises 13 cooling holes, each one of said second sets of third row cooling holes comprises 4 cooling holes, each one of said third sets of third row cooling holes comprises 10 cooling holes, and each one of said fourth sets of third row cooling holes comprises 5 cooling holes.

25. The combustor liner of claim 24 wherein there are 12 of said third row arrays.

26. A method of making a combustor liner of the type having a first annular panel section having a first cooling nugget formed at one end thereof, a second annular panel section having a second cooling nugget formed at one end thereof, and at least one igniter tower formed in said first annular panel section, said method comprising the steps of:
forming a first row of cooling holes in said first cooling nugget;
forming a second row of cooling holes in said second cooling nugget, said second row of cooling holes being arranged in a preferential cooling pattern comprising a plurality of arrays, wherein each said array comprises a first set of cooling holes having a first diameter and a second set of cooling holes having a second diameter that is smaller than said first diameter; and
circumferentially aligning with one of said second sets of cooling holes with said at least one igniter tower.

27. The method of claim 26 wherein all of said cooling holes in said first row of cooling holes are formed with the same diameter.

28. The method of claim 27 wherein all of said cooling holes in said first row of cooling holes are formed with a diameter of about 0.89 millimeters.

29. The method of claim 26 wherein said first diameter is about 0.74 millimeters and said second diameter is about 0.63 millimeters.

30. The method of claim 29 wherein each one of said first sets of cooling holes comprises 10 cooling holes, and each one of said second sets of cooling holes comprises 16 cooling holes.

31. The method of claim 30 wherein there are 12 of said arrays.

32. The method of claim 26 further comprising the step of forming an additional row of cooling holes in said second annular panel section, wherein said additional row of cooling holes is circumferentially aligned with said at least one igniter tower.

33. The method of claim 32 wherein said additional cooling holes are formed with a diameter of about 0.81 millimeters.

34. The method of claim 32 wherein there are 15 of said additional cooling holes.

35. The method of claim 26 further comprising the step of forming a third row of cooling holes formed in a third cooling nugget of a third annular panel section, said third row of cooling holes being arranged in a preferential cooling pattern comprising a plurality of arrays, wherein each one of said third row arrays comprises a first set of cooling holes having a first diameter, a second set of cooling holes having a second diameter, a third set of cooling holes having a third diameter, and a fourth set of cooling holes having a fourth diameter.

36. The method of claim 35 wherein said first diameter of said third row is about 0.81 millimeters, said second diameter of said third row is about 0.94 millimeters, said third diameter of said third row is about 0.81 millimeters, and said fourth diameter of said third row is about 0.94 millimeters.

37. The method of claim 36 wherein each one of said first sets of third row cooling holes comprises 13 cooling holes, each one of said second sets of third row cooling holes comprises 4 cooling holes, each one of said third sets of third row cooling holes comprises 10 cooling holes, and each one of said fourth sets of third row cooling holes comprises 5 cooling holes.

38. The method of claim 37 wherein there are 12 of said third row arrays.

* * * * *